United States Patent [19]

D'Alelio

[11] 3,905,926

[45] Sept. 16, 1975

[54] POLYMERIZABLE LIGNIN DERIVATIVES

[76] Inventor: Gaetano F. D'Alelio, 2011 E. Cedar St., South Bend, Ind. 44617

[22] Filed: Dec. 14, 1973

[21] Appl. No.: 424,879

[52] U.S. Cl.............................. 260/17.5; 260/124 A
[51] Int. Cl.² ......................................... C08L 97/00
[58] Field of Search...................... 260/17.5, 124 A

[56] References Cited
OTHER PUBLICATIONS

Mihailo et al., "Epoxyresins from Lignin," Chem. Abstracts 58, 4452c (1963).
Mikhailov et al., "Epoxy Resins from Lignin," Chem. Abstracts 59, 4159f (1963).
Mikhailov et al., "Epoxy Resins & Varnish from Sulfate Lignin, Phenol, and Epichlorohydrin," Chem. Abst. 64, 14416g (1966).
Tai et al., "Lignin. LVII. Utilization of Lignin 5. Adhesive from Lignin Epoxide," Chem. Abstracts 68, 4092h (1968).
Lee et al., "Handbook of Epoxy Resins," N.Y., McGraw–Hill, 1967, pp. 2–3 and 2–4, TP1180E6L4.

*Primary Examiner*—Melvin Goldstein
*Assistant Examiner*—E. A. Nielsen
*Attorney, Agent, or Firm*—Walter J. Monacelli

[57] ABSTRACT

This invention deals with polymerizable lignin derivatives containing at least one

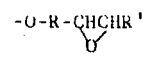

moiety, wherein R represents a divalent hydrocarbon containing one to 12 carbon atoms, and R' represents hydrogen and a monovalent hydrocarbon containing one to 12 carbon atoms useful in the coating, adhesive, laminating and molding industries.

19 Claims, No Drawings ated of lignin containing structures of the formula,

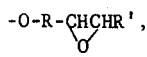

wherein R represents a divalent hydrocarbon containing one to 12 carbon atoms, and R' represents hydrogen and a monovalent hydrocarbon containing one to 12 carbon atoms.

POLYMERIZABLE LIGNIN DERIVATIVES

BACKGROUND OF THE INVENTION

This invention deals in general with lignin derivatives containing polymerizable oxirane groups. More specifically, it deals with new compounds which are derivatives of lignin containing structures of the formula,

DESCRIPTION OF PRIOR ART

To obtain cellulose from natural materials containing ligno-cellulose, the material is subjected to a chemical treatment which solubilizes the lignin to a degree which will allow the cellulose to be separated in the form of fibers. The dissolved lignin constitutes between about 25 and 45% of the ligno-cellulose, the amount depending on the process used, the extent of the solubilization and the source of the ligno-cellulose which usually is wood from trees, which are usually classified as soft and hard woods.

Lignin has such a limited commercial utility that its disposal has become a source of serious ecological and economic problems. In the past, most of the lignin solutions have been sewered or pumped directly into rivers and streams, destroying the ecological balance of the environment. Small amounts of lignin are used as drilling muds or are calcined to yield adsorbent, activated carbons. Much of it is concentrated by evaporation to a lower water content and sprayed into a furnace to burn the lignin, and from the ashes thus produced, a partial amount of the inorganic chemicals used in the process is recovered. The amount of lignin used in these applications represents a very small fraction of the millions of tons of lignin generated yearly as a by-product of the pulp and paper industry. Stringent anti-pollution regulations have obligated this industry to commit about one-half billion dollars a year for pollution control, the cost of which led to severe economic problems which resulted on the assumption of these expenditures by the industry. The burning of the lignin for its fuel value and for the recovery of inorganic minerals is insufficient to recover the cost of the pollution control. Eventually, the total cost of producing cellulose products from ligno-cellulose materials will be borne by the ultimate consumer in the form of higher prices for the products, unless substantial credit can be obtained by upgrading or modifying the lignin through a high volume utilization. Lignin can be recovered from pulping operations in the form of brown amorphous powder, if it is dried to eliminate substantial quantities of water.

The lignin is obtained as a by-product of any of the processes used industrially to obtain cellulose from ligno-cellulose compositions. In the sulfite processes, sulfonate moieties are attached to coniferyl units in the lignin and act as solvating groups to produce a water-soluble lignin; the water-insoluble form can be produced from these soluble lignins by acidification or by other chemical treatments. The alkaline process for preparing cellulose is more efficient than the sulfite process and produces higher yields of cellulose fiber. In the alkaline process, liquors containing either sodium hydroxide or a mixture of sodium hydroxide and sodium sulfide are used to produce "alkali lignin" as a lignin salt which is soluble in the pulping liquor, from which it can be recovered conveniently by acid precipitation; the lignin isolated depends upon the specific conditions under which the lignin is obtained. Thus, if it is precipitated at a pH in the range of 9.5 to 10.0, a lignin salt is obtained, but if it is precipitated at a low pH, below 7.0, and washed thoroughly with water, the free lignin is obtained. By adjustment of the pH, fractions of various molecular weights can also be obtained and isolated. Most of the paper pulp, of the order of 90% or more, is produced in this country by the Kraft process, with liquors containing sodium sulfide. Unfortunately, sodium sulfide simultaneously produces dimethyl sulfide and methyl mercaptan. To reduce or overcome this odor problem, some pulps are manufactured by the peroxide process, which is based on hydrogen peroxide adjusted to specific pH values. Minor amounts of lignin are obtained, at the present time, from the peroxide processes, but the volume is expected to increase.

For the purposes of this invention, lignin is intended to mean recovered lignin, that is, lignin separated and isolated from ligno-cellulose by any process, whether it is water-soluble or water-insoluble, and of the molecular weight obtained by the specific process and whether or not it has been fractionated. It is not intended to mean proto-lignin which defines lignin as it occurs in nature, in which it is chemically bound to cellulose. Proto-lignin has greater chemical complexity than recovered lignin; it is insoluble not only in water but in many chemical solvents in which lignin is soluble and thus would not normally lend itself for economical use in the upgrading reaction of this invention. Even recovered lignin is a complex substance of a polymaleic nature. An exact chemical structure cannot be written which encompasses all lignins, since its composition will depend on its source and on the process by which it was isolated. One principal variation in lignin appears to be the number of methoxy groups present in the molecule. For example, hardwood lignin contains about 10 to 21% by weight of methoxy groups, whereas in the lignins from softwood, this amounts to about 14 to 15%. Also, depending on the chemical treatment and history, the number of carboxyl groups will vary between two and four. Similarly, the number of phenolic hydroxyls will depend on the chemical treatment and will vary from about one to four per thousand gram weight of lignin. The molecular weight of the lignin molecules will also vary; for example, it was shown in Tappi, 47 (No. 8), pp. 471–475 (1964), that one type of softwood lignin contains about 20 segmers (units) in its molecule, whereas about 15 segments were present in a hardwood lignin. Thus, $M_w$ for one type of softwood lignin is 3,500 and for one type of hardwood, it is 2,900. In addition, the heterogeneity for the softwood, as measured by $M_w/M_n$ for the softwood lignin was 2.2 compared to the more heterogeneous value of 2.8 for the lignin from the hardwood. Nonetheless, all lignins has molecularly structural features that classify them as lignins, and which account for their physical and chemical characteristics. They are low molecular weight polymers which could be classified as oligomers, varying in molecular weights from about 2,000 to about 8,000. The polymeric structure, which does not appear to be uniform, is nonetheless based on a coniferyl-type alcohol as the repeating unit, which accounts for the benzene rings in its constitution. The presence of phenolic hydroxyls, methoxy groups, ether linkages, alcoholic hydroxyls, keto and carboxyl grouups in lignin have been well established. The number of coniferyl-type units, which contain phenolic hydroxyls or phenolic ethers convertible to phenolic hydroxyls, alcoholic hydroxyls, and carboxyl groups can vary, on an average between from about 10 and 20. Tentative structural features in a segment of an average pine lignin prepared by the Kraft process are shown in FIG. 1; these features were proposed by J. Morton in Tappi, 47 (No. 11), pp. 713–719, 1964. Reference is also made to this article and to Tappi, 47 (No. 8), pp.471–476, 1964 and C & EN, July 6, 1964, pp. 88–93 for structural features of the repeating units in lignin.

or coating of a substrate or filler, and thereafter they perform as crosslinkers during the thermal curing. U.S. Pat. No. 2,357,090 describes such a modification of phenolic resins by lignins.

Another method proposed to utilize lignin is given in U.S. Pat. No. 3,519,581, July 7, 1970, which proposed that lignin be dissolved in a solvent and reacted with an organic polyisocyanate. The solvent can be volatile solvent or a substantially non-volatile solvent, such as glycol, which is reactive also with the polyisocyanate as introduced into the mixture or after it has become esterified with the carboxyl groups in the lignin. In most instances, the amount of modifying agents is equal to or exceeds the weight fraction of the lignin. In certain cases, the polyisocyanate itself can be the solvent for the lignin, as for example, if the alkali lignin, as distinguished from free lignin, has been reacted with selected halides or diethyl sulfate, or if the polyisocyanate is first

TENTATIVE CONSTITUTIONAL SCHEME OF A SEGMENT OF KRAFT PINE LIGNIN

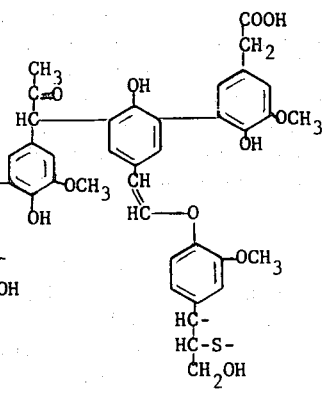

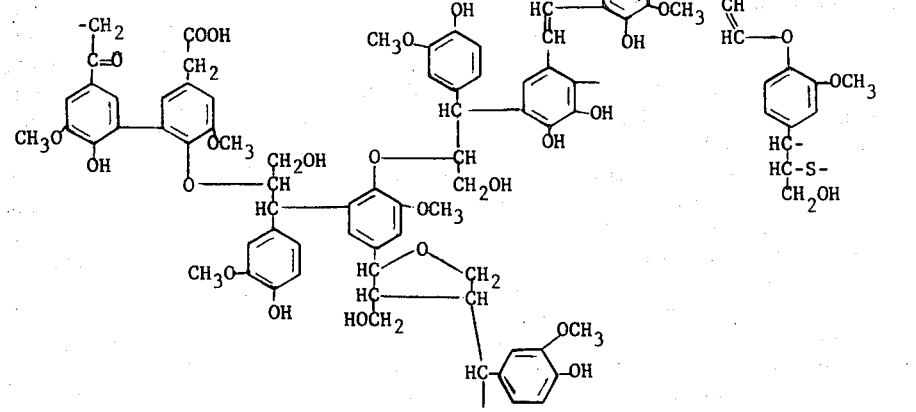

FIGURE 1

The coniferyl rings in lignin are related structurally to a phenol, and theoretically, have potentially reactive sites for reaction with formaldehyde to produce resins similar to the synthetic phenol-formaldehyde resins. However, the high degree of substitution, that is, low functionality per phenol, as well as the extent of substitution in the positions ortho- and para- to the phenolic hydroxyl groups, retards both the rate of the resinification reaction, and the extent of crosslinking, so that finished products are obtained which are unsatisfactory with regard to physical properties and resistance to heat, chemical attacks, and solvents. Most of the phenols in the coniferyl rings are monofunctional with respect to reactions with formaldehyde, and behave as if they were 2,4-dialkyl phenols. In attempts to overcome this deficiency, lignin has been dissolved in a phenol and the condensation of the solution with formaldehyde performed, or it has been dissolved in alkaline phenolic resoles (the phenol alcohols resulting from the alkaline catalyzed condensation of phenols and formaldehyde) or in solutions containing such resoles, and then cured. In these cases, the lignin constituted the minor amount of the composition; the methylol phenols from the originally added phenol, act as a solvent and plasticizer for the lignin during impregnation blocked. Such systems have been proposed for the production of foamed structures. Foams prepared by this method are fragile and brittle.

In U.S. Pat. No. 2,854,422, September 1958, there are described compositions comprising a diisocyanate-linked condensation elastomer based essentially on the reaction of high molecular weight end-capped diisocyanates and lignin. Also, there is disclosed in U.S. Pat. No. 2,906,718, September 1959, lignin-reinforced vulcanizable rubber stock comprising a rubber, a lignin and a polyisocyanate.

To modify or upgrade lignin so that it may have wide industrial use economically, relatively low cost chemical reagents must be used, and the processing costs must be minimal. Also, in such converted lignin, the original lignin molecule, preferably, should account for a substantial portion by weight of the lignin derivative; or for a substantial portion of the raw material cost.

THE DISCLOSURE OF THE INVENTION

It is an object of this invention to produce chemical derivatives of lignin which are capable, through the functional groups of the derivatives of coupling or chain-extending the lignin derivative into a cross-linked three-dimensional structure. These derivatives can be classified as polymerizable lignin derivatives containing per mole of lignin at least one and preferably more than 1.5 moieties of the formula $$-O-R-\underset{\underset{O}{\diagdown\diagup}}{C}HCHR'$$

wherein R represents a divalent hydrocarbon group containing one to 12 carbon atoms and R' represents hydrogen and a monovalent hydrocarbon contaning one to twelve carbon atoms. The R group can be saturated or unsaturated, aliphatic, cycloaliphatic or aromatic, or mixtures of such groups, such as $-CH_2-$, $-CH_2CH_2-$, $-CH(CH_3)-$, $-CH=CH-$, $$-\underset{CH_3}{\overset{}{C}}=CH- \ , \ -\underset{C_6H_5}{\overset{C_6H_5}{C}}=\underset{}{\overset{}{C}}- \ ,$$

$-CH_2C\equiv C-$, $-CH_2CCl=CCl-$, $-CH_2CCl_2CCl_2-$, $-C_4H_8-$, $-C_5H_{10}-$, $-C_8H_{16}-$, $-C_{10}H_{22}-$, $-C_{12}H_{24}-$, $-C_6H_{10}-$, $-CH_2C_6H_4CH_2-$, $-CH_2C_6H_{10}CH_2-$, $-CH_2C_6H_4-$, $-(CH_2)_3C_6H_4(CH_2)_3-$, $-CH_2C_{10}H_6-$, $-CH_2C_{10}H_6CH_2-$, etc.

The R' group can be aliphatic, cycloaliphatic or aromatic, saturated or unsaturated, ethylenic or acetylenic, etc., as in the case of R. Illustrative examples of R', in addition to hydrogen, are: $-CH_3$, $-C_2H_5$, $-C_3H_7$, $-C_4H_9$, $-C_5H_{11}$, $-C_7H_{15}$, $-C_9H_{19}$, $-C_{12}H_{25}$, $-CH_2C_6H_5$, $-C_6H_5$, $-C_{10}H_7$, $-CH=CH_2$, $-CH_2CH=CH_2$, $-CH_2CH=CHCH_3$, $-C_6H_{11}$, $-C\equiv CCH_3$, etc. The preferred R group is $-CH_2-$ and the preferred R' group is hydrogen. Thus, the preferred lignin derivatives contain the $$-OCH_2\underset{\underset{O}{\diagdown\diagup}}{C}HCH_2$$

moiety.

It is the purpose of this invention to convert one or more of the functional groups present in lignin to an oxirane derivative, $$-O-R-\underset{\underset{O}{\diagdown\diagup}}{C}H_2CHR'$$

by the reaction of the lignin under appropriate reaction conditions, with the halooxiranes represented by the formula $$X-R-\underset{\underset{O}{\diagdown\diagup}}{C}H_2CHR',$$

wherein X is selected from the class of chlorine, bromine and iodine, and R and R' have the same meaning as described above. For reasons of commercial availability, and particularly economy, epichlorohydrin of the formula $$ClCH_2\underset{\underset{O}{\diagdown\diagup}}{C}HCH_2 \ ,$$

is the preferred halooxirane for the reaction with lignin.

A wide range of temperatures and pressures may be used to convert the lignin to the oxirane derivative, from about 25°C up to 150° to 200°C, depending on the reactions and the boiling points of the solvents, if used, and from atmospheric pressure to two or three atmospheres, in the case of low boiling solvents.

There are three functional groups in lignin available for conversion to an $$-OR\underset{\underset{O}{\diagdown\diagup}}{C}HCHR'$$

moiety, namely, the phenolic hydroxyls, the carboxyl groups and the aliphatic alcoholic groups are observed in FIG. 1, which, for purposes of convenience, can be illustrated as $$Lg\langle\bigcirc\rangle OH \ ;$$

LgCOOH and LgOH respectively.

It is a further objective of this invention to modify the coupling reactions of the oxirane-lignin derivatives other chemical substances which coreact with them, such as monomers, oligomers or polymers.

The phenolic hydroxyls, shown in FIG. 1 as attached to the benzene ring, react with halooxiranes in the presence of a hydrohalide acceptor, as follows:

$$Lg\langle\bigcirc\rangle OH + XR\underset{\underset{O}{\diagdown\diagup}}{C}HCHR' \xrightarrow[acceptor]{HX} Lg\langle\bigcirc\rangle OR\underset{\underset{O}{\diagdown\diagup}}{C}HCHR' \quad \text{Eq. 1a}$$

$$Lg\langle\bigcirc\rangle OH + ClCH_2\underset{\underset{O}{\diagdown\diagup}}{C}HCHR' \xrightarrow[acceptor]{HCl} Lg\langle\bigcirc\rangle OCH_2\underset{\underset{O}{\diagdown\diagup}}{C}HCH_2 \quad \text{Eq. 1b}$$

An inorganic or organic hydrohalide acceptor which does not react with the reagents in the system can be used, as is well known in the epoxy monomer and polymer art as the hydrohalide acceptor, such as sodium hydroxide, potassium hydroxide, sodium carbonate, sodium bicarbonate, lithium hydroxide, lithium carbonate, tertiary amines, such as trimethylamine, triethylamine, tributylamine, pyridine, quinoline, sodium aluminate, etc., and others, which are well known in the epoxy-monomer and resin arts, can be used.

The halooxirane, $$XR-\underset{\underset{O}{\diagdown\diagup}}{C}HCHR' \ ,$$

alone can be used as the solvent for the reaction with lignin, in which case, the halooxirane is used in excess and the moles of phenolic groups converted to oxirane groups is determined by the mole ratio of base to phenolic groups. Thus, 2 moles of NaOH will allow two phenolic hydroxyls in lignin in the presence of excess epichlorohydrin to be converted to glycidyl ethers, whereas 5 moles of NaOH will allow up to 5 moles to be converted to glycidyl ether groups. In a similar way, the glycidyl forming reaction can be performed in the presence of solvents inert to the reactants or the products of reaction to control the degree of conversion to the oxirane derivative.

When solvents are used for the preparation of the lignin derivatives of this invention, the specific solvent will depend on whether or not it is reactive with the components of the system. Thus, phenols, cresol, thymol, etc. are examples of phenolic solvents for lignin and even though they have reactive hydroxyl groups, they may be used as solvents in the esterification reactions mentioned hereinafter. However, these phenols will also react with the halooxirane, for example, epichlorohydrin, if used as a solvent in the reaction of lignin with epichlorohydrin, but in some instances, this is desirable, since the resulting phenyl glycidyl ethers are capable of copolymerizing with the epoxidized lignin while at the same time action as a plasticizer or flow-producing agent for the total composition. In most cases, an easily recoverable solvent is preferred and its choice will depend on the specific nature and molecular weight of the lignin system and the chemistry to be done. Lignin is soluble in such solvents as the ketones, for example, acetone, methyl ethyl ketone, the pentanones from petroleum, triethyl phosphate, ethyl oxalate, dioxane, dioxalane, tetrahydrofuran, methyl cellusolve, butyl cellusolve, cellusolve acetate, propylene glycolmethyl ether and the like, as well as the simple alcohols, such as ethyl, allyl, butyl, amyl, hexyl, etc., alcohols which can function as reactants as well as solvents for the system. A particularly useful solvent is one derived from by-products of the pulp and paper industry, namely, dimethyl sulfoxide, DMSO. DMSO is obtained by the oxidation of dimethyl sulfide which is a by-product obtained when ligno-cellulose is delignified by sodium hydroxide-sodium sulfate in the Kraft process. DMSO is easily recovered from the reaction system and generally is the preferred solvent.

The carboxyl groups present in lignin can also react with the base used as the hydrohalide acceptor in equation 1.

Any base consumed in neutralizing the carboxylic groups present in the lignin, if they are not already in the form of a salt, also act as hydrohalide acceptors for the reaction, and become converted eventually to the free acidic carboxylic groups, which can participate in the crosslinking reaction with the epoxy groups, when the derived lignin is subjected to curing under crosslinking conditions.

The conditions under which the reaction of equation 1 is performed usually causes the phenolic hydroxyls to react with the halooxirane, as for example, with epichlorohydrin almost to the exclusion of the carboxyl and aliphatic alcohol groups.

The conditions used to epoxidize the phenolic hydroxylics are not the ideal conditions for converting the carboxylic groups, in their sodium salt form, to epoxy derivatives such as the glycidyl esters, as illustrated by the following equation

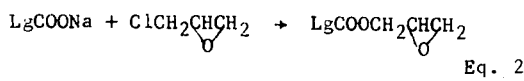

Eq. 2 because of a very low rate of reaction. However, if desired, the rate can be accelerated by catalytic quantities of quaternary ammonium halide, such as R″$_4$NX, where X is a halogen such as bromine, chlorine or iodine, and R″ represents a hydrocarbon containing one to twelve carbon atoms which can be saturated or unsaturated, aliphatic, cycloaliphatic, heterocyclic, aromatic is well known in the art for this type of reaction. Typical examples are tetramethyl ammonium bromide, tetrabutyl ammonium chloride, benzylpyridinium chloride, cetylpyridinium chloride, etc. Numerous other examples are given in U.S. Pat. No. 3,020,262, to which reference is hereby made.

Similarly, the rate of reaction of the halooxirane,

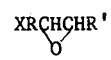

with the phenolic hydroxyls is much higher than with the alcoholic hydroxyls.

However, the lignin carboxyl and alcohol groups can be reacted with the epihalohydrin under acidic conditions, using any of numerous Lewis acid catalysts, as is well known in the epoxy resin art, namely, such as HF, AlCl$_3$, SbF$_5$, SnCl$_4$ and BF$_3$, to form a haloglyceryl ether which is then dehydrohalogenated by bases such as sodium hydroxide or sodium aluminate, or any base, salt of compound which can act as a hydrohalide acceptor shown in equation 3. In this alternate method, not only the phenolic hydroxyls, but the carboxylic groups and the alcohol hydroxyls can be converted to glycidyl ethers as well.

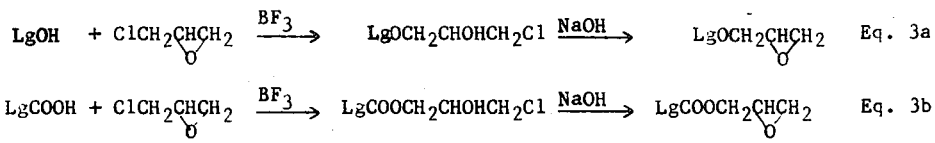

The extent of the conversion will obviously depend on the amount of epihalohydrin which is reacted with the lignin in the acid-catalyzed step, and this, in turn, depends on the amount of epihalohydrin mixed with the lignin. When low degrees of conversion are desired, inert solvents can be used to dilute the reaction mixture. These reaction systems generally are performed as substantially anhydrous systems.

In either of the two procedures used for converting all or part of the functional groups to oxirane structures, if it is desired, the —COOH groups can be inactivated first by converting them to ester groups, LgCOOR″ by the standard well known procedures of reaction with monofunctional alcohols, R″OH. For reasons of economy, I prefer to use a continuous azeotropic esterification process in the presence of an esterification catalyst with the R″OH alcohols, in which R″ represents a hydrocarbon containing one to 12 carbon atoms, which can be aliphatic or cycloaliphatic, saturated or unsaturated, ethylenic or acetylenic, etc. The preferred alcohols are ethyl, propyl, allyl, butyl, isobutyl, secondary butyl, the amyl alcohols, and especially the low-cost mono-alcohols, including isomeric mixtures, derived from petroleum intermediates and hydrocarbons containing six to twelve carbon atoms.

Similarly, in either of the two procedures for converting all or part of the functional groups in lignin to oxirane structures, all or part of the alcoholic groups in lignin can be modified first by converting them to ester groups. LgOOCR‴ by standard well known esterification procedures, including continuous azeotropic esterification with monocarboxylic acids, R‴COOH wherein R‴ represents hydrogen, and hydrocarbon groups containing one to 20 carbon atoms, and substituted hydrocarbon groups containing —COOR″ groups. The group R‴ can be aliphatic, cycloaliphatic, aromatic and heterocyclic, as well as saturated and unsaturated. The R‴COOH can be formic, acetic, butyric, heptoic, benzoic, trichloroacetic, naphthenic acid from petroleum, or the saturated half-ester of dicarboxylic acid void of vinyl-type unsaturation, such as monoethylsuccinate, mono-butyl phthalate, etc., which do not introduce additional crosslinking sites. If additional crosslinking sites are desired, they can be introduced by esterification of the alcoholic moieties by such unsaturated acids as acrylic, methacrylic, crotonic, etc., or by the use of the half-esters of alpha-beta unsaturated dicarboxylic acids such as maleic, fumaric and itaconic, in which the single ester groups does not contain vinyl-type unsaturation, such as the monoesters of R″OH alcohols, or in which it does contain such unsaturation, such as the allyl, methallyl and crotyl half ester.

For most applications, it is sufficient to convert only the phenolic hydroxyls to oxirane groups, leaving the carboxyls and hydroxyls unchanged or unesterified, which groups can later contribute to the adhesion of the modified lignin to substrates, such as fillers, sheets, etc.

For some applications, such as for coatings, the alcoholic hydroxyls can be esterified with drying oil and semi-drying fatty acids, directly or by ester exchange with the oils themselves, as is well known in the art. These drying oils fatty acids can be described as $R_d COOH$, or as their natural glycerides, $(R_d COO)_2 C_3 H_5$, wherein $R_d$ represents the unsaturated hydrocarbon portion of the acid which can contain one, two or three double bonds, as disclosed in my U.S. Pat. No. 3,654,240, to which reference is hereby made. Instead of $R_d COOH$, the corresponding $R_d COCl$ or $R_d (CO)_2 O$ can be used. In these $R_d$- compounds, $R_d$ is an unsaturated hydrocarbon moiety containing no less than 15 and nd more than 20 carbon atoms and consisting of a terminal —CH₃ group and at least one and no more than four —CH═CH— groups and the remainder consisting of —CH₂— groups. $R_d$ structures in $R_d COOH$ acids of this kind are disclosed in my U.S. Pat. No. 3,203,915, Aug. 31, 1965 and U.S. Pat. No. 3,287,298, Nov. 22, 1966. The $R_d COOH$ acid includes oleic, 9,12-linoleic; 9,11-linoleic; linoleic, arachidonic, licanic, parinaric, eleostearic, palmitoleic, petroselinic, vaccenic, cetolic, etc., acids; the acids from dehydrated and isomerized castor oil; as well as the mixed fatty acids derived from soybean, octicica, tung, linseed, etc. oils, the average compositions of which are also known in U.S. Pat. No. 3,203,915. The $R_d COCl$ compounds are readily derived from $R_d COOH$ by reaction with $SOCl_2$; anhydrides of $R_d COOH$ are also readily prepared by the reaction of $R_d COCl$ with carboxylic acids or their alkali salts.

When the reactions by which the lignin derivatives of this invention are to be performed preferably in an anhydrous condition, I have discovered that the lignin can be dried by the simple expedient of subjecting it to azeotropic drying prior to use by means of such azeotroping agents as benzene, toluene, xylene, cyclohexane, the hexane to pentane fractions of gasoline, the chlorinated hydrocarbons such as trichloroethylene and similar substances used in the dry-cleaning industry, etc. In those modifications involving esterification, prior drying is not required, if the esterification is performed azeotropically, since the elimination of the water can be achieved simultaneously with the esterification.

When the carboxyl groups and the aliphatic hydroxyl groups are converted to derivatives other than oxirane derivatives, such as the esters described hereinabove, it is preferred that these derivatives be prepared before the phenolic hydroxyls are reacted with the halooxirane,

as for example, with epichlorohydrin. Thereafter, at least one or more of the phenolic hydroxyls are converted readily to oxirane ethers. However, the large number of eight or nine such oxirane ether structures per mole of lignin or per 2,800 to 8,500 mole weight of lignin are not always required for effective crosslinking, or chain extension or for coreactions with other molecules, though at least one and preferably more than one such as 25 to 75% of the phenolic hydroxyls preferably are converted to oxirane ethers. For some applications, it is desirable to convert all of the phenolic hydroxyls to the oxiranes, and in other applications, as when maximum thermal and dimensional stabilities are required, the carboxyl and aliphatic alcohol groups are advantageously converted to oxirane groups. The phenolic hydroxyls not converted to oxirane ether groups may be left unconverted or they can be converted, particularly where alkali resistance is required, to other structures such as ethers or esters. Their conversion to phenyl-type esters by use of acyl anhydrides or acyl chloride is feasible but not economical. However, their conversion to ethers is economical. This conversion can be accomplished by reaction of the phenolic hydroxyls, as phenylates or in the presence of a lowcost base such as sodium hydroxide, with primary alkyl halides, or with alkyl acid sulfates or disulfates, thus

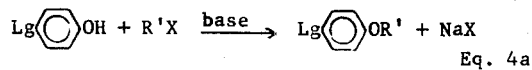

Eq. 4a

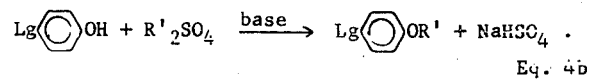

Eq. 4b

Such etherizing agents which do not contain unsaturation as butyl chloride, benzyl chloride, trichloroethyl chloride, $Cl_3 CCH_2 Cl$, dimethyl sulfate, diethyl sulfate, etc., are satisfactory for this purpose, and since in this case, no unsaturated groups are introduced into the lignin, the vinyl-type unsaturation must be introduced through the carboxylic and alcoholic groups. Etherizing reagents which, however, contain unsaturated vinyl-type moieties such as found in the allyl, methallyl, crotyl and similar halides perform the dual function of eliminating the inhibiting effect of the phenolic hydroxyls while simultaneously introducing crosslinking vinyl-type structures. Such vinyl ether-type structures complement similar vinyl structures which can be introduced when the carboxyl groups are esterified with allyl alcohol, methallyl alcohol and the like, or when the aliphatic alcohol groups are esterified with R‴COOH acids containing olefinic unsaturation such as acrylic, methacrylic, maleic half-esters, etc.

The modified lignins hich contain introduced >CH═CH< -type structures can be polymerized alone as such, or in the presence of added vinyl monomers containing one or more CH₂=C< groups, such as vinyl acetate, styrene, divinyl-benzene, diallylphthalate and the like, or copolymerized with low or high molecular weight coreactive polymers, such as modified or unmodified dihydric alcohol maleates, fumarates or itaconates, etc., generally known as unsaturated polyesters or alkyls, oil-modified alkyls, natural and synthetic rubbers and elastomers, etc., as well as admixed with reactive or non-reactive oligomers and polymers, whether synthetic or natural, including wood. By appropriate formulations, the modified lignins of this invention can be converted to foamed products for insulation uses.

The lignin-epoxy derivatives can be converted to the insoluble, infusible state thermally or catalytically by primary, secondary and tertiary amines or by diacids or dianhydrides alone or in the presence of tertiary amines by the same well known procedures used in the epoxy resin art. They can also be copolymerized with other epoxy-monomers, -oligomers and -polymers, as well as with other monomers or polymers containing reactive hydrogens, such as ureas, dicyandiamides polyalkylene amines, polyacrylamides, etc., as is well known in the epoxy resin art.

The modified lignins of this invention are particularly useful, not only in alleviating the ecological problems by converting them to industrially useful derivatives, but also by having the capability of utilizing other products which also contribute to ecological damage. They may be used to produce reconstituted wood products such as panels, furniture components, etc., by compounding them with waste products of the pulp, paper and wood industries, such as the ground bark of trees, wood chips, sawdust, wood shavings, shredded or pulped newsprint in inked or deinked condition, shredded paper and fiber board cartons, exploded wastewood fibers; hulls of seeds, the shells of peanuts and other plants, the pressed residues of oil-bearing seeds, rice hulls, etc. As reinforcing and non-reinforcing fillers, there also can be used dried clays, fly-ash, sand, gravel, crushed glass recovered from bottles, etc., scrap synthetic fibers from industry or from consumer sources.

The following examples illustrate the practice of this invention. All percentages, here as well as throughout the specification, are by weight unless otherwise specified.

EXAMPLE 1

In a suitable reactor, there is added 9.6 liters of dimethyl sulfoxide (DMSO) and 3,000 g (~1.0 moles) of lignin* which is characterized as follows:

| | |
|---|---|
| moisture content | ~3.0% |
| ash | 0.75% |
| methoxy content | 13.9% |
| sulfur | 1.4% |
| sintering point | ~200°C |
| molecular weight | ~3000 |
| phenolic hydroxyls | ~8/mole | and the mixture stirred at 50° to 70°C for about 1 hour, until a homogeneous solution is obtained. The 3,700 g (40 moles) of epichlorohydrin are added and the mixture stirred until it is homogeneous.

* Commercial product known as Indulin AT, West Virginia Pulp and Paper Co., Charleston, S.C.

Then 369 g of 92.1% flaked sodium hydroxide (8.5 moles) was added slowly to the reaction mixture and heated to 90° to 100°C for 14 hours, after which time it was cooled to room temperature. Then the major portion of the excess epichlorohydrin is recovered by distillation either at atmospheric pressure or at water aspirator pressure, leaving a DMSO solution containing approximately 26% of epoxidized lignin which can be used as such in many applications. Alternately, the product may be isolated as follows.

The DMSO solution is added to 40 liters of distilled water, yielding a light-brown precipitate which is recovered by filtration, washed twice again with water to complete the removal of water-soluble materials, and dried at 50° to 70°C for 24 hours. The yield is 3,306 g (97%). Determination of the epoxy content by treatment with dioxane-HCl and backtitrating with standardized HCl indicated that about 2.6 epoxy groups had been introduced per each 1,000 g of lignin, or 7.8 epoxy groups per about a mole weight of lignin. This incomplete conversion can be attributed in part to consumption of some of the NaOH by the free —COOH groups in the lignin. This conversion is raised to 3,408 g (100%) when 400 g (9.2 moles of 92.1%) of NaOH are used in the system.

These epoxidized lignins, No. 1 and No. 2, are brown powders having the properties of multi-substituted epoxy derivatives which show imitial fusion points of about 160°C. By varying the amount of NaOH, various degrees of substitution are obtained by using the procedure described above, as indicated in Table 1.

Table 1

Degree of Epoxide Substitution on Lignin as Function of Moles of Base

| Resin No | (92.1%) Moles | NaOH Approx. grams | No. of Phenolic Epoxy Groups | % of Theory | Approximate Sintering or Fusion Point °C |
|---|---|---|---|---|---|
| 1 | 9.2 | 400 | 8.00 | 100.0 | 160 |
| 2 | 8.5 | 369 | 7.80 | 97.5 | 160 |
| 3 | 8.0 | 365 | 7.68 | 96.0 | 163 |
| 4 | 7.0 | 304 | 6.65 | 95.0 | 168 |
| 5 | 6.0 | 261 | 5.58 | 93.0 | 173 |
| 6 | 5.0 | 217 | 4.57 | 91.4 | 177 |
| 7 | 4.0 | 174 | 3.58 | 89.6 | 181 |
| 8 | 3.0 | 130 | 2.60 | 87.0 | 185 |
| 9 | 2.0 | 87 | 1.71 | 85.0 | 191 |

Almost identical products are obtained if, instead of 40 moles (five times theory) of epichlorohydrin, there is used 1,480 g (two times theory) or 1,110 g (1½ times theory) or 925 g (1¼ times theory) when the epoxidation reaction is extended to 24 hours. Similar products are obtained when, instead of DMSO, dimethylformamide, dimethylacetamide, tetramethyl urea, dioxane, tetrahyderofurane are used as solvent for the reaction. Epichlorohydrin, in the absence of other solvents, can also be used as the solvent as well as the reactant, as for example, when in Resin No. 2, 3,000 g of lignin are dispersed in 10 liters of epichlorohydrin.

EXAMPLE 2

A water-soluble commercial lignin containing about 4.0% of bound sodium, known as sodium lignate, is used in this example. The amount of sodium which makes this lignin* water-soluble corresponds to about 1.5 moles of sodium per mole of lignin containing about two carboxylic groups in the form of carboxylic acid salts. This type of lignin may be characterized as follows:

| | |
|---|---|
| moisture content | ~6.00 ± 3% |
| ash | ~9.72 ± 2% |
| pH | 9.85 ± 0.3% |
| methoxy content | 12.70 ± 1.2% |

* Indulin B, West Virginia Pulp and Paper Co. North Charleston, South Carolina

The procedure of Example 1 is repeated twice, using DMSO with 9 and 5 moles of NaOH (93%), respectively, per mole of sodium lignate to yield resins No. 10 and No. 11 respectively, which have epoxy contents which are in reasonable agreement, when corrected for their sodium contents, with those prepared in Example 1, As Resins No. 1 and No. 5 respectively, as shown in Table 2.

Table 2

Epoxidation of Sodium Lignates

| Resin No. | NaOH (93%) moles | No. Epoxy Group | % of Theory |
|---|---|---|---|
| 10 | 9 | 8.00 | 100 |
| 11 | 5 | 5.75 | 94 |

EXAMPLE 3

Three hundred g of the lignin of Example 1 is added to 1,500 g of butyl alcohol in a reactor equipped with a Dean-Stark trap, reflux condenser, heating and stirring means, etc. To the flask is added 5 g of toluene sulfonic acid monohydrate and the mixture refluxed at 93° to 117.7°C until no more water is collected in the trap, leaving the butyl ester of the lignin in solution in butyl alcohol. The lignin-butyl ester derivative (Resin No. 12) can be isolated as a brown powder or may be left in solution for preparing other derivatives utilizing the phenolic or the alcoholic functions of both. When desired, non-reactive azeotropic agents such as benzene, toluene, xylene, cyclohexane, trichloroethylene and other well known agents in the art can be used together with the alcohol. For example, when the butyl alcohol in the above procedure is replaced by propyl or allyl alcohol, a non-reactive azeotroping agent such as toluene, etc., is preferably present in amount up to 30% or 40% by weight of the weight of the alcohol. By the above procedures, the following lignin ester derivatives, shown in Table 3, are readily prepared in substantially quantitative yields.

Table 3

Lignin Carboxyl Esters

| Resin No. | Lignin Carboxyl Ester | Alcohol Used | Azeotrope Agent |
|---|---|---|---|
| 12 | Butyl | Butyl | Butyl Alcohol |
| 13 | Ethyl | Ethyl | Toluene |
| 14 | Methallyl | Methallyl | Benzene |
| 15 | Allyl | Allyl | Toluene |
| 16 | Crotyl | Crotyl | Trichloroethylene |
| 17 | Amyl | Amyl | Benzene |
| 18 | Trichlorobenzyl | Trichlorobenzyl | Toluene |

EXAMPLE 4

The following example illustrates the conversion of the lignin esters of Example 3 to epoxy derivative. The procedure of Resin No. 2 of Example 1 is used to react resins of Example 3 with epichlorohydrin in the presence of NaOH and there is obtained the epoxy derivative shown in Table 4.

Table 4

Epoxy Resins

| Resin No. | Ester Resin Used | Moles NaOH Used | Groups on Resin |
|---|---|---|---|
| 19 | No. 12 | 8.00 | 2 Butyl ester; 7.7. epoxide |
| 20 | No. 12 | 5.00 | 2 Butyl ester 4.60 epoxide |
| 21 | No. 14 | 8.00 | 2 Methallyl ester; 7.63 epoxide |
| 22 | No. 14 | 6.00 | 2 Methallyl ester; 5.80 epoxide |
| 23 | No. 15 | 4.00 | 2 Allyl ester; 3.52 epoxide |
| 24 | No. 16 | 8.00 | 2 Crotyl; 7.82 epoxide |
| 25 | No. 18 | 3.00 | 2 Trichlorobenzyl; 2.91 epoxide |

Resins numbers 21 to 24 inclusive, contain, in addition to the epoxy groups, the polymerizable and copolymerizable unsaturated ethylenic-type structures.

EXAMPLE 5

The procedure of Example 1, Resin No. 2, is repeated in the presence of phenols and additional sodium hydroxide to epoxidize the phenol and the lignin simultaneously. Table 5 indicates the number of moles of phenol per mole of lignin used, and the additional amount of NaOH added to the reaction mixture to accommodate the phenolic reaction. The yields are substantially quantitative.

Table 5

Simultaneous Epoxidation of Lignin and Phenols

| Resin No. | Moles: phenol mole lignin | phenol | Moles NaOH | Sintering Point °C |
|---|---|---|---|---|
| 26 | 8 | phenol | 8.6 | 120 |
| 27 | 16 | phenol | 17.0 | 110 |
| 28 | 16 | m-cresol | 17.0 | 80 |
| 29 | 2 | p-cresol | 2.2 | 130 |
| 30 | 4 | bis-phenol A | 8.4 | 115 |
| 31 | 6 | bis-phenol A | 12.6 | 110 |
| 32 | 8 | bis-phenol A | 16.8 | 105 |

The sintering point of these resins is reduced by 50 to 80% below the sintering point of the corresponding unmodified resin of Example 1.

EXAMPLE 6

The procedure of Example 3 is used to prepare esters of the alcoholic groups in lignin by reaction with carboxylic acids. The typical procedure comprising reacting 0.1 mole of the lignin and approximately 0.50 mole of carboxylic acid with toluene as an azeotropic agent in an apparatus equipped with a Dean-Stark trap for continuous separation of the water of esterification, in the presence of toluene sulfonic acid as a catalyst until no more water of reaction is collected. Table 6 summarizes the carboxylic acid used to esterify the free alcoholic hydroxyls in the lignins. The yields are substantially quantitative.

Table 6

Lignin Alcoholic Esters

| Resin No. | Lignin Used | Carboxylic Acid Used |
|---|---|---|
| 33 | Indulin AT | Butyric |
| 34 | " | Acetic |
| 35 | " | HOOC—CH$_2$ |
| 36 | " | CH$_2$COOCH$_2$CH=CH$_2$<br>HOOCCH<br>C$_2$H$_5$OOCCH |
| 37 | " | HOOCCH |
| 38 | " | CHCOOCH$_2$CH=CH$_2$<br>(o)HOOCC$_6$H$_4$COOC$_3$H$_7$ |
| 39 | " | HOOCC$_6$H$_3$(COOCH$_2$CH=CH$_2$)$_2$ |
| 40 | " | CH$_2$=C(CH$_3$)COOH |
| 41 | Resin No. 12 | HOOCCH |
| 42 | Resin No. 14 | CHCOOCH$_3$<br>HOOCCH<br>CHCOOCH$_2$CH=CH$_2$ |

In Resins No. 41 and No. 42, both the carboxylic acid groups (Example 3) and the aliphatic alcohol groups have, in the two-step esterification process, been converted to ester functions. As indicated in Example 3, the isolation of the carboxylic acid ester is not essential prior to the conversion of the alcoholic groups to esters. Also, the alcoholic groups can be esterified first with carboxylic acids, if so desired, to be followed by esterification of the carboxylic groups by alcohols.

Alternately, Resins Nos. 35, 36, 37, 38 and 40 may be prepared by reacting the lignin alcohol groups with carboxylic acid anhydrides to yield half esters of the anhydrides which, in turn, are esterified by the procedure of Example 3 to the desired alcohols, as illustrated in Example 7.

EXAMPLE 7

The lignin of Example 1, 300 g (0.1 mole) is dried and dissolved in dioxane, to which is added 44.2 g (0.45 moles) of maleic anhydride and the mixture refluxed for 5 hours, to yield the half-ester of maleic acid on the alcoholic hydroxyls in the lignin. Evaporation of the solvent leaves the maleic lignin ester as a brown powder. Similarly, the lignin esters illustrated by Resins No. 12 to No. 18 inclusive, of Example 3, as well as the lignin-phenyl ethers, illustrated hereinafter in Example 8, can be reacted with maleic anhydride or other anhydrides to produce hemi-esters, which have utility in themselves as well as serving an intermediates for the preparation of other reaction derivatives. Further examples of half-esters are included in Table 7, using an amount equivalent to 0.5 mole of maleic anhydride.

Table 7

Lignin Half-Esters of Polycarboxylic Anhydrides

| Resin No. | Anhydride Used | Alcohol-Ester Linkage |
|---|---|---|
| A | Maleic | —COOCCH=CHCOOH |
| B | Succinic | —COOCCH$_2$CH$_2$COOH |
| C | Phthalic | —COOCC$_6$H$_4$COOH |
| D | Mellitic-tri | —OOCC$_6$H$_3$(COOH)$_2$ |

Following the esterification procedure of Example 3, Resin A on esterification with ethyl alcohol, yields Resin No. 36; with allyl alcohol Resin No. 37; Resin B with allyl alcohol yields Resin No. 35; Resin C with propyl alcohol yields Resin No. 38; and Resin D with allyl alcohol yields Resin No. 39. These ester lignins, in turn, are readily converted to oxirane derivatives by reaction with

by the procedure of Example 1.

EXAMPLE 8

Part I. Three hundred g of the lignin of Example 1 is dissolved in a reactor in ethanol, to which is added 43.5 g of 92.1% NaOH as a 10% solution in ethanol, to convert the phenolic hydroxyls to alkali-phenates, after which the alcohol is removed by distillation to dryness, leaving a dry powder. Then the toluene is added and the mixture refluxed to remove traces of water azeotropically, if desired, after which the toluene is removed by distillation. Alternately, azeotropic drying can be omitted if a slight excess of the dialkyl sulfate, used hereinafter as the etherizing agent, is used. To the dry powder in the reactor there is then added 3 liters of dimethylsulfoxide or dioxane, and the mixture agitated mechanically.

Part II. There is added slowly 13.6 g of dimethylsulfate and the mixture reacted at 20°–35°C temperature for 6 to 8 hours, yielding the phenyl methyl ether derivative of lignin, Resin No. 43, in which the carboxy groups have also been converted to methyl esters. If it is desired to isolate the etherized lignin, this is done by distilling off a substantial quantity of the dioxane or dimethyl sulfoxide and washing the residue with water to remove sodium salts and excess sodium hydroxide, filtering and drying. If other reactions are to be performed on the etherized lignin, as for example, esterification of the alcoholic hydroxyls by monocarboxylic acids, or by carboxylic acid dianhydrides, or by reaction with

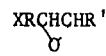

in the presence of Lewis acids, for example, BF$_3$(C$_2$H$_5$)$_2$O, etc., the lignin derivatives may be left in solution and one or more consecutive reactions performed. The degree of etherization of phenolic hydroxyls in lignin is determined by the mole ratio of alkylating agent to moles of phenolic hydroxyls present in the lignin, using one mole of base per each mole of dialkyl sulfate. Appropriate corrections are made for the —COOH groups present in the lignin and whether or not that they exist as the carboxylate salt of sodium hydroxide or equivalent base. For example, when the sodium lignate salt of Example 2 is used in the above procedure, in which it supplies the equivalent of 1.5 moles of NaOH per mole of lignin, there is obtained Resin No. 43A whose properties in general are similar to those of Resin No. 43.

The procedure of this Example 8 is repeated, using the lignin of Example 1 and molar amounts of dimethyl sulfate (DMS) sufficient to etherize 6, 4, 2 and 0 of the 8 phenolic hydroxyls per mole of lignin, plus an addition of 2 moles of dimethyl sulfate to compensate for the carboxylic functions. Equivalent amounts of NaOH corresponding to the dimethyl sulfate are used and there are obtained the resins shown in Table 8 in substantially quantitative yield.

Table 8

Etherization of Lignin

| Resin No. | Moles of DMS mole of lignin | Number per mole of Phenolic OH etherized | —COOH esterified |
|---|---|---|---|
| 43 | 10 | 8.0 | 2.0 |
| 44 | 8 | 6.0 | 2.0 |
| 45 | 6 | 4.0 | 2.0 |
| 46 | 4 | 2.0 | 2.0 |
| 47 | 2 | 0.1 | 1.9 |

Substitution of other dialkyl sulfates such as diethyl sulfate, dipropyl sulfate, etc., for the dimethyl sulfate of way, 8 produce, in a similar waya, the corresponding ethers.

EXAMPLE 9

The Resins numbered 44-47 inclusive, of Example 8, are reacted with excess epichlorohydrin by the procedure of Example 1 with molar quantities of NaOH pulse a 5% excess corresponding to the number of unetherized phenolic hydroxyls (8 minus number of etherized groups) and there is obtained the corresponding epoxidized lignins containing carboxy ester groups, some phenolic oxirane groups as well as aliphatic alcoholic groups, as given in Table 9.

Table 9

Epoxidized Lignin Containing Ester and Ether Groups

| Resin No. | Number per mole of lignin | | |
|---|---|---|---|
| | Epoxy Groups | Phenolic Ether | —COOCH$_3$ |
| 48 | 2.0 | 6.0 | 2.0 |
| 49 | 4.0 | 4.0 | 2.0 |
| 50 | 6.0 | 2.0 | 2.0 |
| 51 | 7.9 | 0.1 | 1.9 |

EXAMPLE 10

This example illustrates the curing of the lignin-oxirane compounds. Six solutions containing 25% by weight of 34 parts of Resin No. 1 in 136 g of dimethyl sulfoxide are prepared. To each solution is added the curing reactant in the amount indicated. The solutions are cast as films on Teflon plates and heated, yielding crosslinked films, which are insoluble in DMSO, dimethyl formamide and the solvents in which lignin is normally soluble. The data are summarized in Table 10.

Table 10

Cured Lignin-Oxirane Derivatives

| Solution | Curing Agent* amount: g | | Temp. °C | Time: hours | Results |
|---|---|---|---|---|---|
| 1 | DET; | 1.60 | 110 | 15 | Shiny, hard, insoluble, ductile film |
| 2 | GEN; | 12.00 | 110 | 15 | Shiny, flexible, insoluble, tough film |
| 3 | MPA; | 4.32 | 110 | 15 | Hard, shiny, insoluble film |
| | | | 130 | 2 | |
| 4 | PA; | 11.80 | 110 | 10 | Hard, shiny, insoluble film |
| | | | 130 | 3 | |
| 5 | EMTPA; | 13.12 | 110 | 7 | Hard, shiny, insoluble film |
| | | | 125 | 6 | |
| 6 | DET; Gen; | 0.80 6.00 | 110 | 15 | Shiny, hard film intermediate to film of solutions 1 & 2 |

*DET=diethylenetriamine;
GEN=Genamide 250, a liquid polyamine-polyamide made from dimerized fatty acids and alkylene polyamines;
MPA=metaphenylenediamine;
PA=phthalic anhydride containing DMP-30 (tridimethylaminoethyl phenol) 3% by weight as an accelerator;
EMTPA=endomethylene tetrahydro-phthalic anhydride containing 2% by weight of DMP-30.

Wood and fiberboard panels are coated with Solutions No. 1 to No. 6 inclusive and cured to give solvent-resistant, hard, shiny black surfaces.

EXAMPLE 11

Thirty-seven g of dried Resin No. 45 containing 4 phenolic methyl ethers and 2 methyl carboxylic esters and about 4 phenolic hydroxyls with about 2 aliphatic alcoholic groups is dissolved in 200 g of anhydrous DMSO containing 5.65 g of epichlorohydrin. Then, at 25°C, 1.4 g of boron trifluoride etherate is added and allowed to react for 6 hours, after which 3 g of flaked sodium hydroxide is added and the mixture reacted according to the procedure of Example 1. There is obtained a quantitative yield of a lignin derivative containing, in addition to the methyl ether and the methyl ester group, 4 glycidyl ethers and 2 glycidyl ester groups which cures readily by the procedure of Example 10.

EXAMPLE 12

A. Thirty-four parts of Resin No. 1, 4.4 parts of MPA, 35 parts of dried sawdust are dry-blended to uniformity and pelletized into 1-inch disc and compression-molded at 130°C for 2 minutes, to yield compact, tough, insoluble, infusible moldings.

B. Part A is repeated, using intead of MPA, 10 parts of endomethylene tetrahydrophthalic anhydride, 0.3 g of DMP-30 and moldings similar to A above are obtained.

C. Moldings similar to A and B, but somewhat tougher, are prepared using instead of Resin No. 1, Resins No. 26 to No. 32 inclusive.

EXAMPLE 13

In a glass container a mixture of 10 parts of Resin No. 15, 25 parts of diallylphthalate, 2 parts of acrylic acid, and 1.1 parts of benzoyl peroxide are heated at 60°C for 1 hour, at 90°C for 1 hour, and at 130°C for 3 hours; there is obtained an insoluble, infusible copolymer product having good adhesion to glass.

EXAMPLE 14

One hundred parts of each of Resins No. 26 to No. 32 inclusive are mixed in separate ball mills with MPA (in a ratio of one-half mole of MPA per each mole of epoxy group) until a homogeneous mixture is obtained. Then, to each mill is added a mixture of 50 parts of fly ash, 35 parts of chopped glass fibers to about three-eighths inch long, and 15 parts of dried sawdust and mixing continued for 1 hour. These blends were pelletized into 1-inch discs and molded at 125°C for 3 minutes, to yield compact, tough, insoluble moldings.

EXAMPLE 15

Two hundred parts of undeinked newspaper is pulped in 2,000 parts of water and while it is being agitated, 160 parts of Resin No. 30 dissolved in 500 parts of methanol containing 14.6 parts of meta-phenylenediamine (MPA) is slowly added to the pulp dispersion. Agitation is continued for 1 hour, following which the pulp is formed into sheets on 4 × 4 inches stainless steel 200-mesh screens and dried at 70°C for 24 hours, and then at 100°C for 4 hours. Laminates are prepared from four sheets and pressed at 130°C for 5 minutes at 500 psi, to yield strong, black, tough, well-bonded cured products.

EXAMPLE 16

The procedure of Example 1 is repeated a number of times with similar results using individually, in place of epichlorohydrin, equivalent amounts of respectively, of

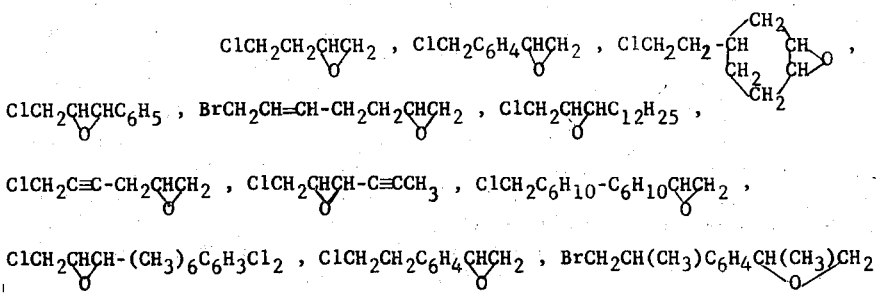

EXAMPLE 17

The procedure of Example 1 is repeated a number of times using individually in place of the dimethyl sulfoxide, equivalent amounts respectively of N,N-dimethyl formamide, N,N-dimethyl acetamide, butyrolactone, tetramethyl urea, N,N-dimethylcyanoacetamide, sucinyldinitrile, sulfolane, hexamethylphosphorictriamide, and malonyl nitrile.

EXAMPLE 18

The procedure of Example 1 is repeated a number of times with similar results, using individually, in place of sodium hydroxide, equivalent amounts respectively of potassium hydroxide, lithium hydroxide, sodium aluminate, potassium aluminate, magnesium oxide, lithium carbonate, triethyl amine, pyridine and tetrabutylammonium hydroxide.

EXAMPLE 19

The procedure of Solution 5 of Example 10 is repeated using equal parts by weight of Resin No. 1 in 136 g of DMSO, and Resin D of Example 10 in 136 g of DMSO as the carboxylic acid type curing agent and a hard, insoluble, shiny film is obtained.

In addition to the groups listed above for R, other divalent hydrocarbon groups suitable for this purpose include: $-CH_2CH=CHCH_2-$, $-C_5H_7(CH_3)-$, $-CH_2C\equiv CCH_2-$, $-C_6H_9(CH_3)-$, $-C_6H_{10}-C_6H_{10}-$, $-C_6H_8-$, $-C_6H_7(CH_3)-$, $-C_6H_4-C_6H_4-$, $-CH_2C(CH_3)=CHCH_2-$, $-CH_2CH_2C_6H_4-$, $-CH_2C(CH_3)=C(CH_3)CH_2-$, $-CH_2CH=CHC_6H_4-$, $-CH_2CH=CHC_6H_{10}-$, $-CH_2C\equiv CC_6H_4-$, $-CH_2CH=CHC_5H_8-$.

In addition to these hydrocarbon groups, halogen substituted hydrocarbon group can also be used in which the halogen atoms are not reactive in the reactions such as aromatic halogen (attached to the carbon atoms of aromatic nuclei) or halogen attached to a carbon atom of an unsaturated group such as $-CH=CCl-$. Typical groups include $-CH_2CHCl=CHCl-$, $-CH_2CCl=CCl-$, $-CH_2CCl=CClCH_2-$, $-CH_2CH=CClCH_2-$, $-CH_2CBr=CCl-$, $-CH_2CBr=CClCH_2-$, $-CH_2C_6H_3Cl-$, $-CH_2C_6H_2Cl_2-$, $-CH_2C_6HCl_3-$, $-CH_2C_{10}H_5Cl-$, $-CH_2C_{10}H_4Cl_2-$, $-CH_2C_{10}H_3Cl_3-$, $-CH_2CBr=CBrC_6H_4-$, $-CH_2CCl=CClC_6H_4-$, and $-CH_2CCl=CClC_6H_3(Cl)-$ In addition to the epoxy curing agents given hereinabove and in Example 10, any of a large number of curing agents, or a mixture of such curing agents can be used to convert the epoxy lignin derivatives of this invention to cured products. A list of suitable curing agents or hardeners are given in the Epoxy Resin Manual, June 1970 by Dow Chemical Company, Midland, Mich., to which reference is hereby made, particularly to the list of miscellaneous hardeners given on page 3 of this reference.

In addition to the groups listed above for R', other typical groups includes: $-CH=CHCH_3$, $-CH=CHC_2H_5$, $-CH_2CH=CHC_2H_5$, $-CH_2CH=CHC_6H_5$, $-CH=CHC_6H_4Cl$, $-C\equiv CC_6H_5$, $-C\equiv CC_6H_4Cl$, $-C\equiv CC_6H_3Cl_2$, $-CH=CHC_6H_3Cl_2$, $-CH_2CH_2C_6H_5$, $-CH_2CH_2C_6Cl_5$, $CH_2CH_2C_6Br_5$, $-CH_2CH_2C_6H_4F$, $-CH_2C_6H_{11}$, $-CH_2C_6H_9$.

Typical groups for R″ include hydrocarbon groups listed above for R′.

While certain features of this invention have been described in detail with respect to the various embodiments thereof, it will, of course, be apparent that other modifications can be made within the scope and spirit of this invention, and it is not intended to limit the invention to the exact details shown above except insofar as they are defined in the following claims.

The invention claimed is:

1. An esterified lignin obtained by esterifying a carboxyl group in a carboxyl-containing lignin with an aliphatic mono-alcohol of 1–16 carbon atoms and also containing per mole of lignin, at least one moiety of the formula

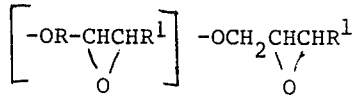

wherein R$^1$ represents hydrogen or a monovalent hydrocarbon radical containing one to 12 carbon atoms.

2. The product of claim 1 containing at least 1.5 moieties of the formula

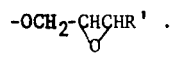

3. The product of claim 1 containing two to eight phenolic ethers of the moiety

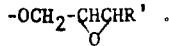

4. The product of claim 1 in which

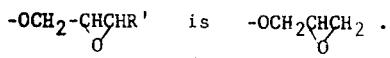

5. The product of claim 2 in which

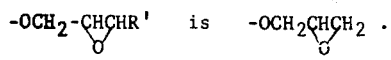

6. The product of claim 2 in which

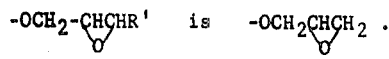

7. The product of claim 3 in which

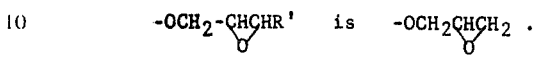

8. A thermosetting composition comprising the lignin of claim 1 and an epoxy curing agent.

9. The product of claim 8 in which the curing agent is an organic amine.

10. The product of claim 9 in which the amine is an aliphatic polyamine.

11. The product of claim 9 in which the amine is an aromatic polyamine.

12. The product of claim 10 in which the amine is a polyamide polyamine.

13. The thermoset composition of claim 8.

14. The product of claim 1 containing polymerizable moiety having >C=C< linkages attached to the lignin.

15. The process of preparing the esterified lignin of claim 1 by reaction of lignin with

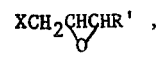

wherein X is a halogen selected from the class of chlorine and bromine, in the presence of a base as a hydrohalide acceptor.

16. The process of claim 15 performed in dimethyl sulfoxide as a solvent.

17. The process of claim 16 performed in the presence of at least one additional phenol.

18. A composition of matter comprising the modified lignin of claim 1.

19. The product of claim 8 in which the curing agent is an organic carboxylic acid anhydride.

* * * * *

UNITED STATES PATENT OFFICE
CERTIFICATE OF CORRECTION

PATENT NO. : 3,905,926
DATED : September 16, 1975
INVENTOR(S) : Gaetano F. D'Alelio It is certified that error appears in the above-identified patent and that said Letters Patent are hereby corrected as shown below:

Col. 10, line 66, correct "hich" to read "which".
Col. 15, lines 25-26, correct the formula to read

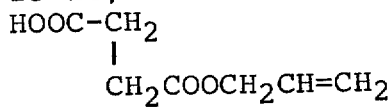

Col. 15, lines 27-28, correct the formula to read

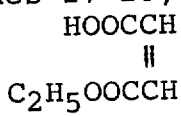

Col. 15, lines 29-30, correct the formula to read

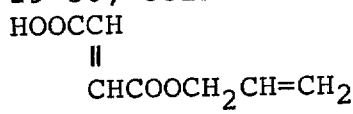

Col. 15, lines 34-35, correct the formula to read

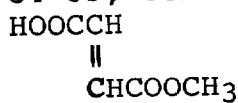

Col. 15, lines 36-37, correct the formula to read

Col. 17, line 62, correct "pulse" to read "plus".
Col. 18, line 66, correct "moldled" to read "molded".
Col. 21, lines 16-19, (claim 1) delete the brackets and the formula contained therein.

Signed and Sealed this twenty-seventh Day of January 1976

[SEAL]

Attest:

RUTH C. MASON
Attesting Officer

C. MARSHALL DANN
Commissioner of Patents and Trademarks